UNITED STATES PATENT OFFICE.

BENJAMIN B. GRAY, OF WILLACOOCHEE, GEORGIA.

PREPARATION FOR DESTROYING BOLL WEEVILS.

1,403,403.   Specification of Letters Patent.   Patented Jan. 10, 1922.

No Drawing.   Application filed May 27, 1920. Serial No. 384,743.

*To all whom it may concern:*

Be it known that I, BENJAMIN B. GRAY, a citizen of the United States, residing at Willacoochee, in the county of Atkinson and State of Georgia, have invented certain new and useful Improvements in the Preparation for Destroying Boll Weevils; and I do hereby declare the following to be a full, clear, and exact description of the invention, such as will enable others skilled in the art to which it appertains to make and use the same.

Preparations for use in destroying boll weevils which infest cotton plants have been generally used, but without success since, while the boll weevils are killed, the plants are also injured by the preparations used.

I have experimented with a large number of preparations for killing boll weevils and have found the objection noted to be inherent in all of the preparations.

I am also aware that liquid preparations of kerosene and coal tar have been used for killing boll weevils, and am conversant with the patents which have been granted for such preparations. However, such preparations of kerosene and coal tar have not been compounded in proportions that will kill the boll weevils, but will not injure the plants.

By extensive experiment I have found the correct proportions which should be used, so as not to destroy the plants, but to insure killing of the boll weevils.

The object, therefore, of my invention is to provide a liquid preparation which is adapted to be burned by any of the well known smoking devices in common use, the smoke generated instantly killing the boll weevils and yet not injuring the plants in the slightest.

My preparation consists of the following ingredients in the proportions named:

Kerosene and coal tar in the proportions of one gallon of kerosene to one pint of coal tar. These ingredients are thoroughly mixed and are converted into a smoke by the use of any of the well known smoking devices in common use for this purpose, and the smoke directed to the plants instantly killing the weevils, but not in any manner injuring the plants.

What I claim to be new is:

A composition for killing boll weevils consisting in the smoke resultant from the ignition of a liquid composed of kerosene and coal tar substantially in the proportion of eight parts to one respectively.

In testimony whereof I hereunto affix my signature.

BENJAMIN B. GRAY.